(12) United States Patent
Matsumura et al.

(10) Patent No.: US 8,031,440 B2
(45) Date of Patent: Oct. 4, 2011

(54) COIL SUPPORT STRUCTURE AND MAGNETIC DISK DRIVE

(75) Inventors: Satoshi Matsumura, Kanagawa (JP); Hideki Mori, Kanagawa (JP); Takaaki Deguchi, Kanagawa (JP); Hiroshi Matsuda, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 926 days.

(21) Appl. No.: 11/524,347

(22) Filed: Sep. 19, 2006

(65) Prior Publication Data

US 2007/0086118 A1    Apr. 19, 2007

(30) Foreign Application Priority Data

Oct. 14, 2005    (JP) .................................. 2005-300978

(51) Int. Cl.
*G11B 21/02*    (2006.01)
(52) U.S. Cl. .................................................... 360/265.8
(58) Field of Classification Search .............. 360/265.8, 360/266.4, 266.5, 266.9, 294.5, 264.7, 265, 360/264.2, 265.7, 265.1
See application file for complete search history.

(56) References Cited

U.S. PATENT DOCUMENTS

| | | | | |
|---|---|---|---|---|
| 5,382,851 A | * | 1/1995 | Loubier | 310/13 |
| 5,523,986 A | | 6/1996 | Ishii | |
| 5,623,759 A | * | 4/1997 | Thorson et al. | 29/603.04 |
| 6,392,846 B1 | * | 5/2002 | Brown et al. | 360/265 |
| 6,512,658 B1 | * | 1/2003 | Jierapipatanakul et al. | 360/264.7 |
| 6,937,443 B2 | * | 8/2005 | Wang et al. | 360/265.8 |
| 6,967,822 B2 | * | 11/2005 | Chang et al. | 360/265.1 |
| 7,597,833 B1 | * | 10/2009 | Brause et al. | 264/261 |
| 2003/0179503 A1 | * | 9/2003 | Choi | 360/265 |
| 2003/0189795 A1 | * | 10/2003 | Chang et al. | 360/256.2 |
| 2004/0012892 A1 | * | 1/2004 | Jeong | 360/265.8 |
| 2005/0063095 A1 | | 3/2005 | Matsumura et al. | |
| 2005/0162782 A1 | * | 7/2005 | Tsuda et al. | 360/264.7 |

FOREIGN PATENT DOCUMENTS

| | | | |
|---|---|---|---|
| JP | 2001-076447 | | 3/2001 |
| JP | 2004194374 | * | 7/2004 |
| JP | 2005-094844 | | 4/2005 |

* cited by examiner

*Primary Examiner* — Daniell L Negron
*Assistant Examiner* — Tamara Ashford
(74) *Attorney, Agent, or Firm* — Mahamedi Paradice Kreisman LLP; Christopher J. Brokaw

(57) ABSTRACT

A voice coil includes a stack of a plurality of layers of aligned windings held between an outer holding portion and an inner holding portion of the carriage assembly. The carriage assembly is formed integrally with the voice coil through injection molding. An outermost peripheral layer is a conductive wire wound a number of turns that falls short of the number of turns required to constitute a complete layer. A step is thereby formed between the outermost peripheral layer and a layer adjacent thereto and inner therefrom. The outer holding portion includes a reinforcement portion formed thereon to cover part of a transverse end face of the voice coil. The outermost peripheral layer opposes a force acting on the outer holding portion from top downward and the reinforcement portion opposes a force acting on the outer holding portion from bottom upward.

15 Claims, 7 Drawing Sheets

COIL SUPPORT STRUCTURE AND MAGNETIC DISK DRIVE

CROSS-REFERENCES TO RELATED APPLICATIONS

This application claims priority from Japanese Patent Application No. JP2005-300978, filed Oct. 14, 2005, the entire disclosure of which is incorporated herein by reference.

BACKGROUND OF THE INVENTION

The present invention relates generally to a support structure for a coil mounted in a carriage of a magnetic disk drive or the like and, more particularly, to a support structure for reinforcing a thin carriage that is injection-molded integrally with a coil.

In magnetic disk drives, an actuator mounted with a voice coil is rotated to position a magnetic head to a predetermined position. The voice coil constitutes, with a voice coil magnet and voice coil yoke mounted on a base, a voice coil motor (VCM). A carriage assembly includes a carriage housing and the voice coil. The carriage housing includes a pivot hole, in which a pivot assembly is mounted, a mounting portion of a head gimbal assembly (HGA), and a holding portion of the voice coil.

In a relatively large magnetic disk drive, the voice coil is affixed with an adhesive to a carriage housing formed through casting. In this case, the carriage housing has a sufficient strength. There is therefore no chance that the carriage housing will be damaged during handling in an assembly process and that the voice coil will be mounted improperly. A carriage assembly adopted in a compact magnetic disk drive, however, includes a coil and a carriage housing that are integrally molded through injection molding of plastic. In such a carriage assembly, the injection-molded synthetic resin surrounds a periphery of the voice coil, leaving the voice coil exposed from both an upper and a lower surface.

FIGS. 1 and 5 of Patent Document 1 (Japanese Patent Laid-open No. 2005-93002) show a carriage that holds a voice coil. The voice coil has an outer peripheral surface and an inner peripheral surface surrounded by a liquid crystal polymer or other synthetic resin. The voice coil is thereby held by the carriage. Accordingly, an upper and a lower surface of the voice coil are exposed from the carriage.

BRIEF SUMMARY OF THE INVENTION

With the recent trend in magnetic disk drives toward a thinner and thinner body, the carriage housing has come to have an even thinner thickness. In the assembly process of magnetic disk drives, the carriage assembly is picked up by tweezers or other mechanical device. A mechanical stress is thus applied to the carriage assembly and there is a good likelihood that the synthetic resin surrounding the voice coil will be damaged. The mechanical stress may, instead, lead to a functional fault during operation of the carriage.

Figure 7:
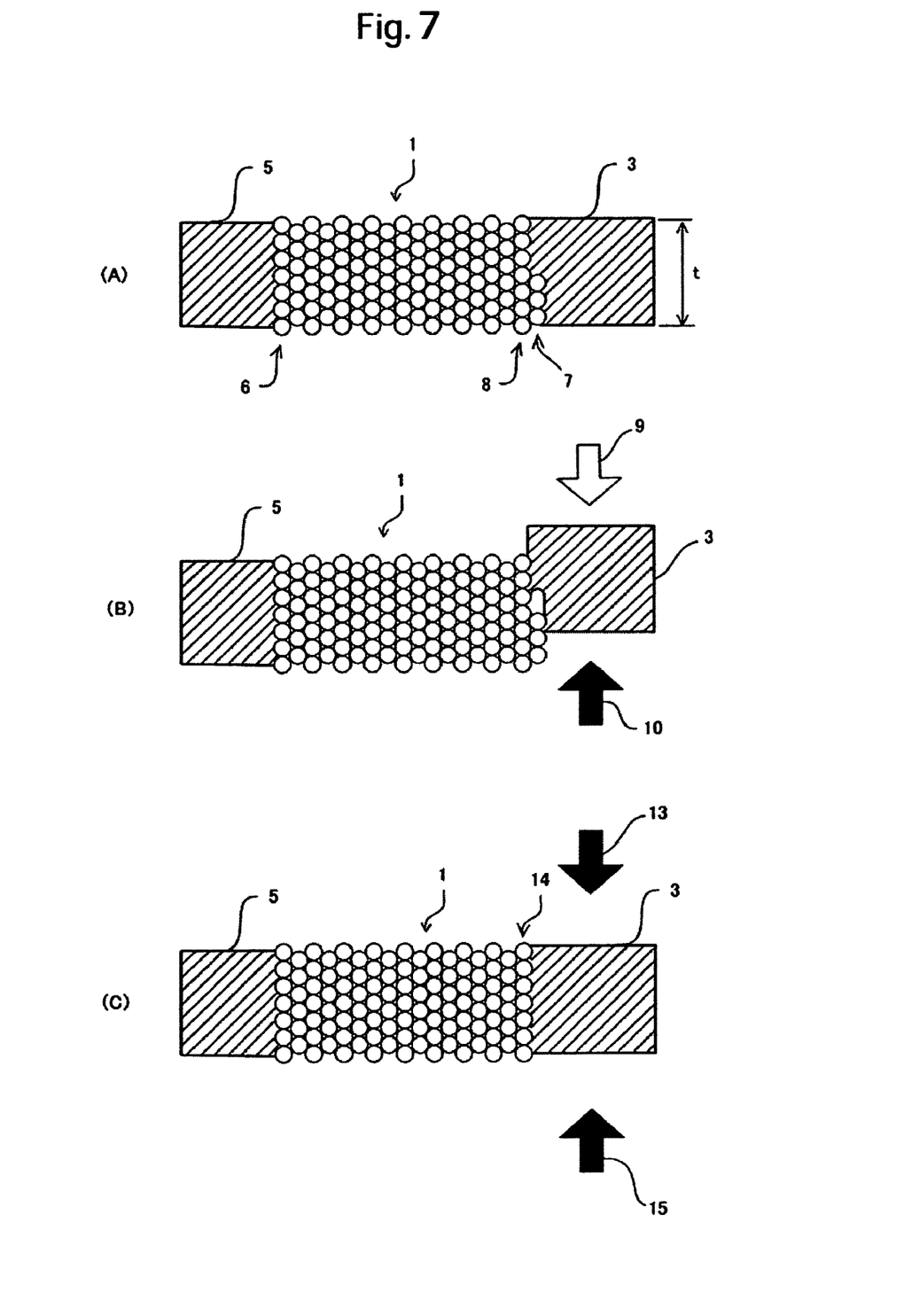
FIGS. 7(A) through 7(C) are views for illustrating modes of damage of the carriage assembly.

A major cause of the damaged carriage housing is the carriage housing that has been made thinner. It has, however, come to be known that the damage is characterized by a mode that is associated with a winding of the coil. FIGS. 7(A) through 7(C) are cross-sectional views showing a voice coil and a synthetic resin that surrounds the voice coil at a position in the carriage assembly farthest from a magnetic head. A carriage housing including an inner holding portion 5 and an outer holding portion 3 is integrally injection-molded with a voice coil 1. The carriage housing and the voice coil 1 are in tight contact with each other on boundary surfaces thereof.

Referring to FIG. 7(A), the voice coil 1 is held between the inner holding portion 5 and the outer holding portion 3. The carriage housing has a thickness t that is thinner than that of conventional devices. The voice coil 1 includes an aligned winding of alternate and repeated seven turns and six turns of a conductive wire being aligned with each from an innermost peripheral layer 6 to an outermost peripheral layer 7. The outermost peripheral layer 7 includes incomplete three turns of the conductive wire. A step that corresponds to a diameter of the conductive wire is formed between the outermost peripheral layer 7 and a layer 8 adjacent thereto on the inside. It has been found that, in such a support structure as that described above, it is likely that the outer holding portion 3 will be deviated in a direction of a lower step as indicated by an arrow 10 in FIG. 7(B) and thereby damaged through human or mechanical handling during a manufacturing process. It has been found that the outer holding portion 3 is less likely to be deviated in a direction of an arrow 9 shown in FIG. 7(B). Referring to FIG. 7(C), an outermost peripheral layer 14 is formed from complete turns of the conductive wire. In the case as shown in FIG. 7(C), however, it has been found that the outermost peripheral layer 14 tends to be deviated in either direction indicated by an arrow 13 or an arrow 15 and damaged.

This invention provides a reinforced voice coil support structure in an injection-molded carriage assembly. This invention also provides a reinforced voice coil support structure by devising the winding of the conductive wire that forms a layer of the voice coil. This invention also provides a magnetic disk drive that employs such a support structure.

In accordance with a first aspect of the present invention, a carriage housing and a coil are formed through injection molding to constitute a carriage assembly. The coil includes a stack of a plurality of layers of a conductive wire to achieve a predetermined number of turns, each layer being aligned windings of the conductive layer. Assuming that a direction in which the coil is stacked is a longitudinal direction, an outer holding portion of the carriage housing holds an outer end face of the coil which is an end face on the outside in the longitudinal direction.

The outer end face of the coil and the outer holding portion of the carriage housing are in tight contact with each other as being injection-molded. There is no need to fix the two members together through a special method, such as using an adhesive or the like. Transverse end faces of the coil are exposed from a front side and a backside of the carriage housing. The front side of the carriage housing opposes a base cover, while the backside thereof opposes a bottom surface of a base. The molded coil has a relatively high stiffness and it is not likely that the coil will be deformed by handling during a manufacturing process. Because of insufficient strength involved offered by a synthetic resin, of which a pivot housing is made, however, the outer holding portion tends to be separated from the outer end face of the coil and damaged during handling in an assembly process, if a thickness corresponding to the distance between the front side and the backside becomes thin.

According to an aspect of the present invention, the outer holding portion includes a reinforcement portion formed thereon for covering part of a transverse end face of the coil exposed. This eliminates the possibility of the outer holding portion's being separated from the coil and damaged. If there is no pronounced orientation in a direction, in which the outer holding portion comes off the coil, or if there is further reduction in strength of the carriage housing due to further promotion toward thinner devices, the carriage housing may be reinforced by providing reinforcement portions so that the portions may cover part of the transverse end faces on both the front side and the backside, respectively. The reinforcement portion may cover the entire surface of the transverse end face of the coil. It is nonetheless preferable that the reinforcement portion cover only partly if there is no extra space between the coil and a voice coil magnet or a voice coil yoke.

The carriage housing may include an inner holding portion holding an inner end face of the coil and a reinforcement portion formed on the inner holding portion, thereby reinforcing the inner holding portion. If the carriage assembly includes a latch engagement portion that protrudes from the outer holding portion, it is highly likely that the latch engagement portion will be held and thus more often given an external force during the assembly process. It is therefore preferable that the reinforcement portion be formed near the latch engagement portion.

The reinforcement portion may be accurately and easily formed if a corresponding shape is formed in a plastic mold and the portion is injection-molded integrally with the carriage housing and the coil. The number of turns in a layer of the coil in contact with the outer holding portion may be selected to form a step between layers of the coil. Depending on the embodiment of the step, the outer holding portion may be oriented toward a direction of its being damaged in a lateral direction of the coil. The step may be formed between an outermost peripheral layer of the coil and a layer adjacent thereto and inner therefrom by reducing the number of turns in the outermost peripheral layer from that in an innermost peripheral layer of the coil. In this case, the number of conductive wires for the outermost peripheral layer should selected so as to fall within a range of about 40% to 60% of the number of conductive wires of the layer adjacent to and inner from the outermost peripheral layer and the conductive wire be wound in alignment with each other from either one of the transverse end faces of the coil. By so doing, the step may give the outermost peripheral layer a strength that is sufficient to oppose an external force in the lateral direction.

As a result, the outer holding portion tends to be damaged in a direction from a higher end of the step toward a lower end thereof. If the step is formed by means of the layers of the coil and the outer holding portion is thereby oriented toward the direction of its being easily damaged as described above, it becomes necessary for the reinforcement portion to cover part of only the transverse end face of the coil disposed in the higher end of the step. Adopting this structure allows the reinforcement portion to be provided only on one side, either the front side or the backside, in order to reinforce the carriage housing. The structure is therefore particularly advantageous in a compact magnetic disk drive, in which space is at a premium. The step formed in the layer of the coil in contact with the outer holding portion is not limited to the arrangement, in which the step is formed between the outermost peripheral layer and the layer adjacent thereto and immediately inner therefrom. Rather, the steps may be formed in a plurality of layers inner from the outermost peripheral layer.

In accordance with a second aspect of the present invention, the method of winding the conductive wire for the outermost peripheral layer of the coil is devised so as to prevent the outer holding portion from being deviated from the outer end face. A step may be formed in the layer of the coil in contact with the outer holding portion so as to prevent the outer holding portion from coming off from the coil in both directions toward the front side and the backside. The carriage housing may thereby be reinforced even without using any reinforcement portion. Forming steps in both directions leaves aligned windings of the conductive wire only at a central portion of the outermost peripheral layer. Alternatively, the aligned windings of the conductive wire may be provided on both sides with none at the central portion of the outermost peripheral layer. Alternatively, the conductive wire in contact with the outer holding portion may still be wound with a spacing interposed between two adjoining turns, instead of using the aligned winding, thereby forming steps in two directions. Still alternatively, the number of turns of each layer is reduced gradually toward the outermost peripheral layer to form steps in a pyramid form.

According to an aspect of the present invention, a reinforced support structure for the voice coil may be provided in the injection-molded carriage assembly. According to another aspect of the present invention, a reinforced support structure for the voice coil may be provided by devising the method of winding the conductive wire that forms the layers of the voice coil. According to still another aspect of the present invention, a magnetic disk drive adopting such a support structure may be provided.

DETAILED DESCRIPTION OF THE INVENTION

Figure 1:
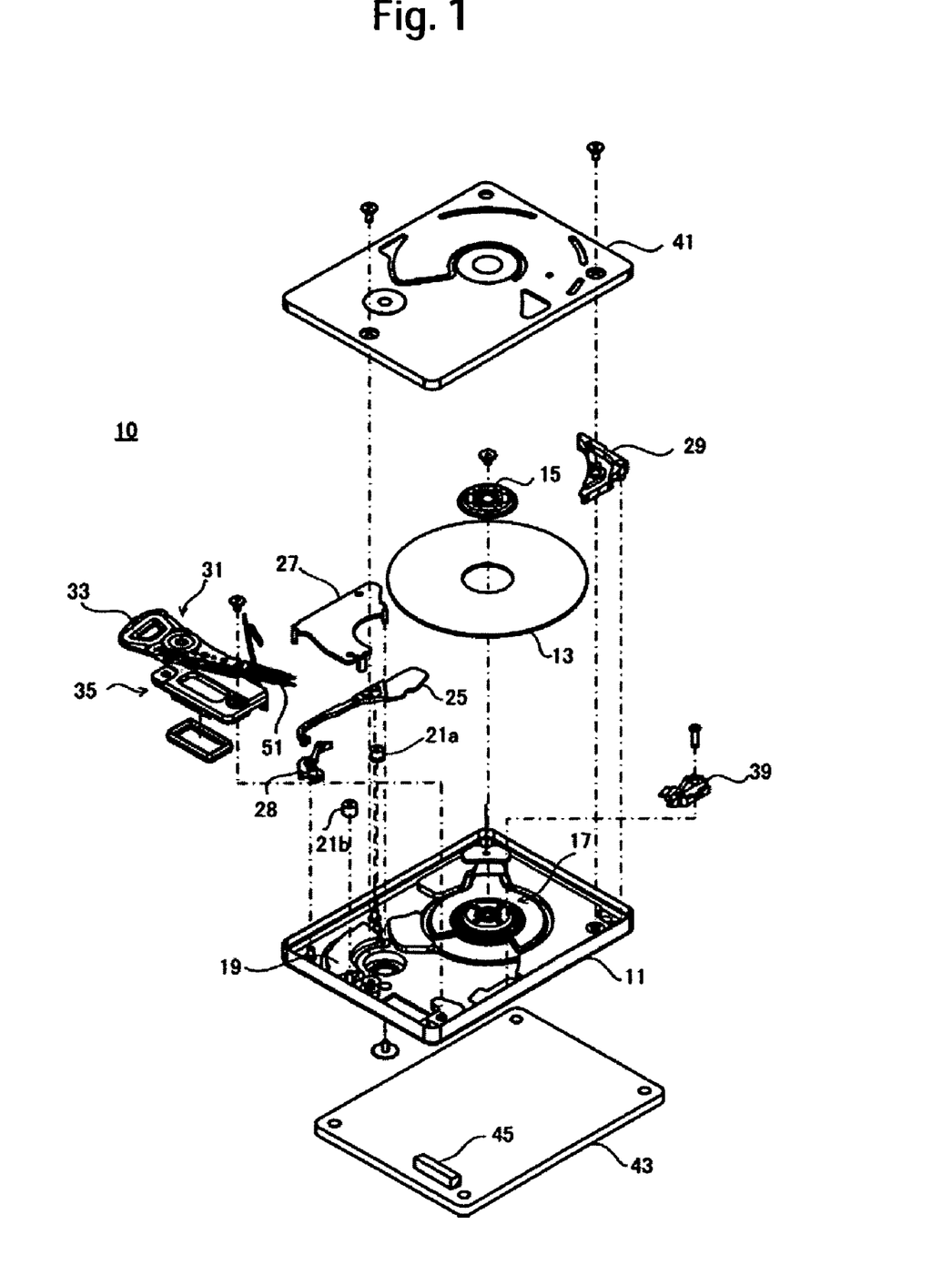
FIG. 1 is an exploded perspective view showing a magnetic disk drive according to an embodiment.
Figure 2:
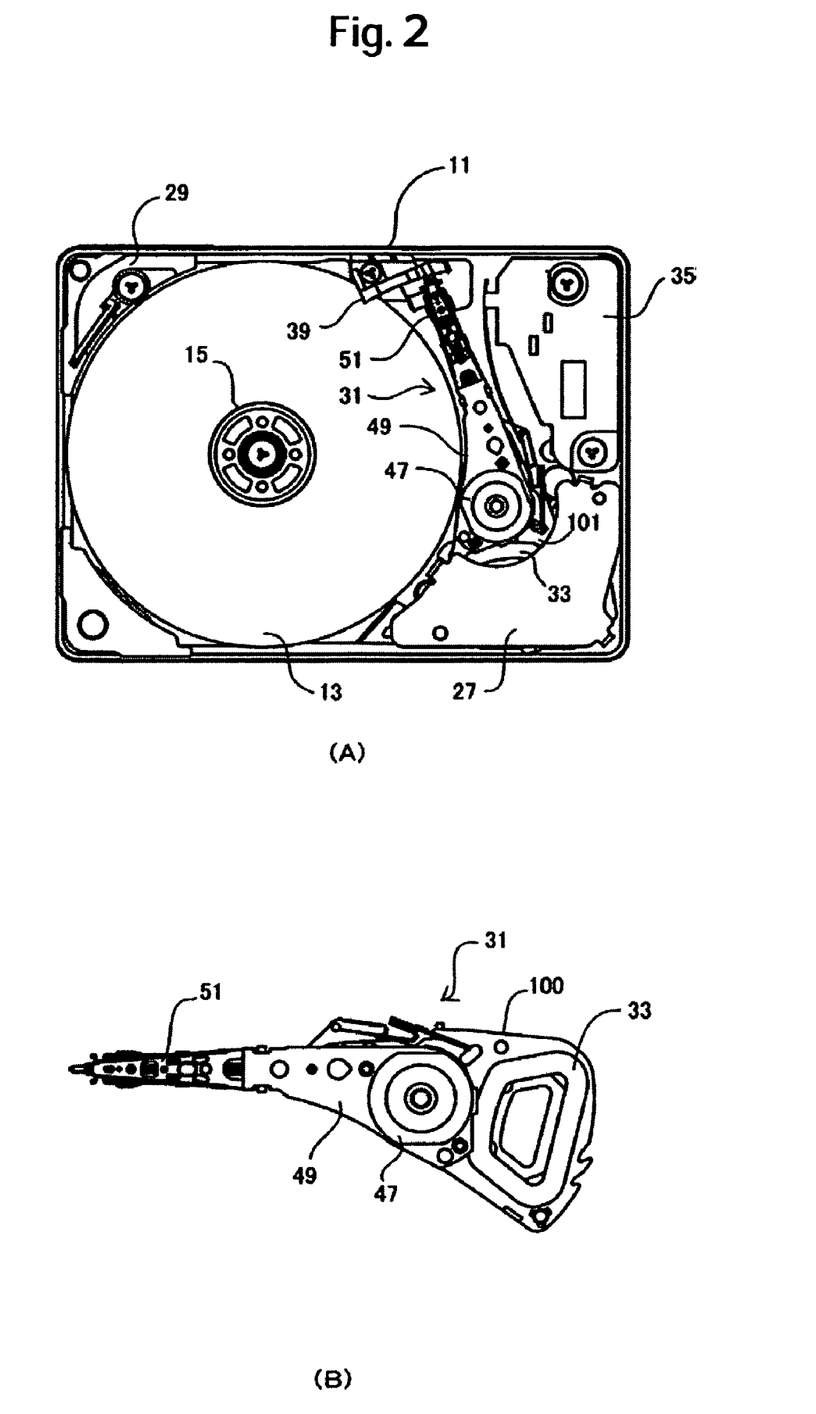
FIGS. 2(A) and 2(B) are plan views showing the magnetic disk drive according to the embodiment.

FIG. 1 is an exploded perspective view showing a magnetic disk drive according to an embodiment of the present invention. FIG. 2(A) is a plan view showing the magnetic disk drive with a base cover removed. FIG. 2(B) is a plan view showing an actuator assembly. A magnetic disk drive 10 may be a compact magnetic disk drive that handles a magnetic disk having a diameter of 1" (25 mm) or less. The magnetic disk drive 10 includes a base 11, on which a spindle motor 17 and a voice coil magnet 19 are mounted. A magnetic disk 13 is secured to a spindle shaft of the spindle motor 17 with a clamp 15. Mounted on the base 11 are a circulation filter block 29, a ramp mechanism 39, a latch mechanism including a long lever 25 and a short lever 28, crash stops 21a, 21b, and a voice coil yoke 27.

In addition, an actuator assembly 31 is mounted rotatably about a pivot assembly 47 on the base 11. The actuator assembly 31 includes a carriage assembly 100, an actuator arm 49, an HGA 51, and the pivot assembly 47. The carriage assembly 100 includes a voice coil 33. The actuator arm 49 is secured to the carriage assembly 100. The HGA 51 is secured to the actuator arm 49. The HGA 51 includes a load beam, a flexure, and a magnetic head. The voice coil 33, the voice coil magnet 19, and the voice coil yoke 27 constitute a VCM. The VCM serves as a drive source for the actuator assembly 31.

Further, the voice coil 33 and an FPC assembly 35 connected to the magnetic head are mounted on the base 11. With all these elements accommodated, the base 11 is lidded with a base cover 41. A circuit board 43 mounted with a board connector 45 is attached on an outside of the base 11. An FPC connector mounted on the FPC assembly 35 is connected to the board connector 45.

Figure 3:
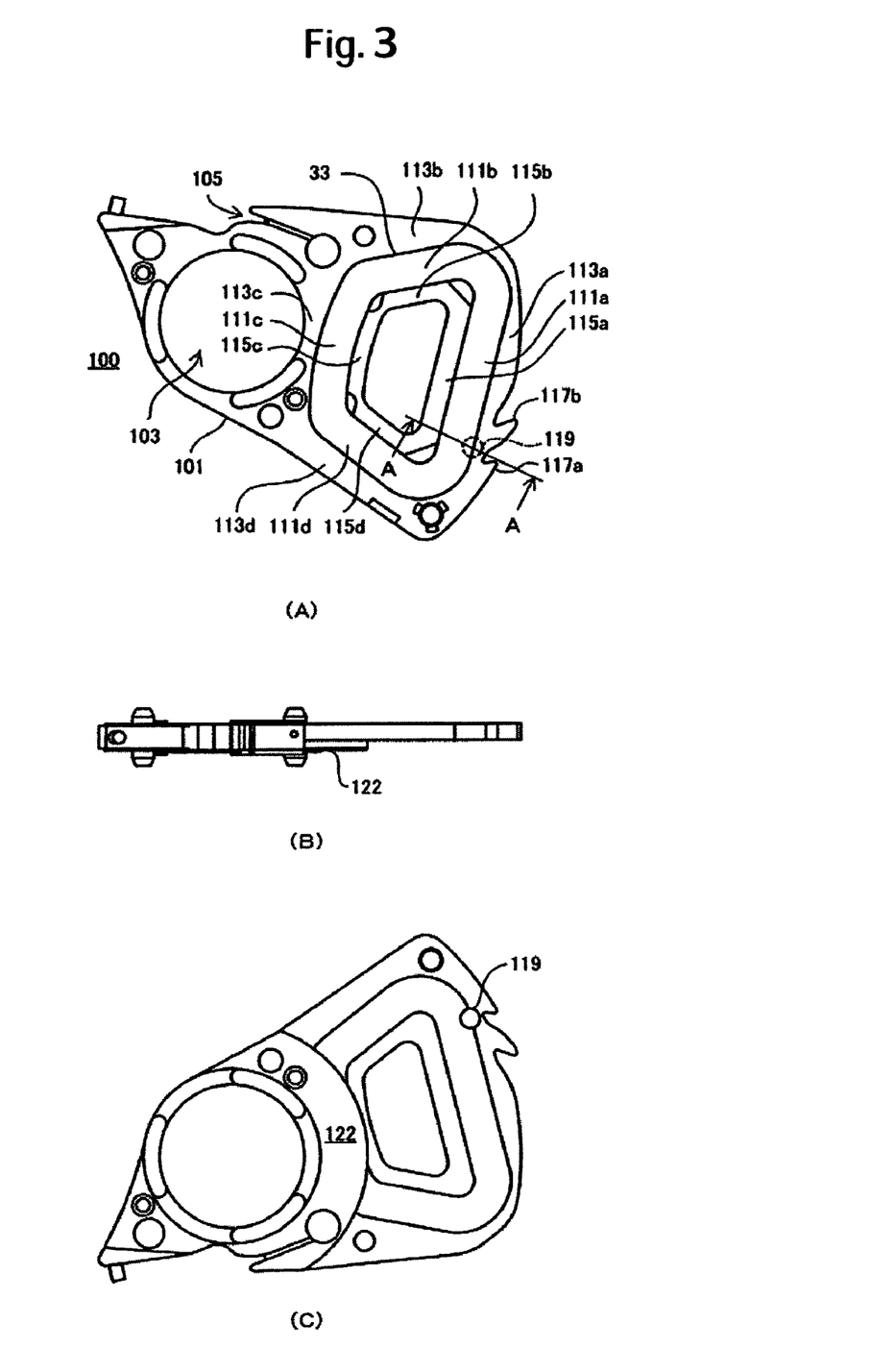
FIGS. 3(A), 3(B), and 3(C) are plan views and a cross-sectional view showing a carriage assembly according to the embodiment.
Figure 4:
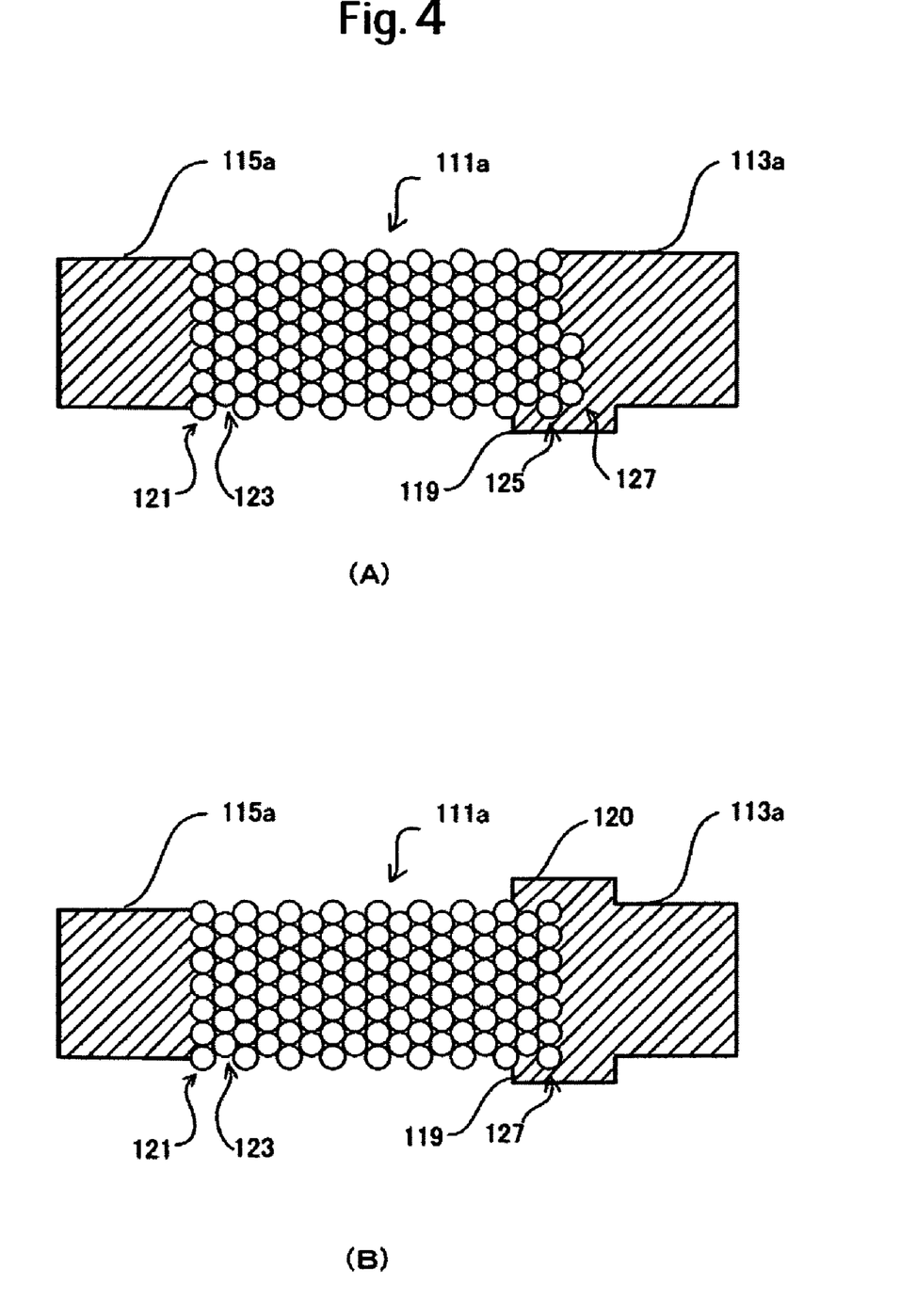
FIGS. 4(A) and 4(B) are cross-sectional views showing a portion of a reinforcement portion of the carriage assembly.

FIG. 3(A) is a plan view showing a front side of the carriage assembly 100 that opposes the base cover 41. FIG. 3(B) is a side elevational view showing the carriage assembly 100. FIG. 3(C) is a plan view showing a backside of the carriage assembly 100 that opposes a bottom side of the base 11. FIGS. 4(A) and 4(B) are cross-sectional views taken along line A-A of FIG. 3(A). The carriage assembly 100 includes a carriage housing 101 and the voice coil 33. The carriage housing 101 includes a pivot hole 103 formed therein. The pivot assembly 47 is inserted into this pivot hole 103. Further, the voice coil 33 is held by the carriage housing 101. The carriage housing 101 is formed through injection molding or the like from a liquid crystal polymer or other synthetic resin. The carriage housing 101 is formed integrally with the voice coil 33. Prior to setup in a mold for injection molding, the voice coil 33 is formed in advance as a winding being wound a predetermined number of turns. Winding of the voice coil 33 will be described later with reference to FIGS. 4(A) and 4(B).

The voice coil 33 includes four coil sides 111a, 111b, 111c, and 111d. The voice coil 33 is formed substantially into a trapezoid such that the coil side 111c disposed near the pivot hole 103 is shorter in length than the coil side 111a disposed farthest from the pivot hole 103. An area, throughout which the carriage housing 101 surrounds an outer end face of the voice coil 33, is defined as outer holding portions 113a, 113b, 113c, and 113d. The outer holding portion 113a opposes the pivot hole 103 across the voice coil 33. Further, an area, throughout which the carriage housing 101 surrounds an inner end face of the voice coil 33, is defined as inner holding portions 115a, 115b, 115c, and 115d.

The outer holding portions and the inner holding portions of the carriage assembly 100 are connected together by a connection portion 122 on the backside of the carriage assembly 100 as shown in FIGS. 3(B) and 3(C). The outer holding portions and the inner holding portions are formed integrally with each other through injection molding. An area surrounding the pivot hole 103 serves as a mounting position of the actuator arm 49 (FIGS. 2(A) and 2(B)). The carriage housing 101 includes a slit 105 formed therein. A flexible cable that forms part of the FPC assembly 35 is secured in the slit 105. The outer holding portion 113a includes latch engagement portions 117a, 117b formed in a protruded condition therein. A pin of the short lever 28 (FIG. 1) that forms part of the latch mechanism is engaged with the latch engagement portions 117a, 117b. In addition, a reinforcement portion 119 like a pad or block is formed on the backside of the outer holding portion 113a.

Surfaces of the voice coil 33 disposed on a front side and a backside, respectively, of the carriage assembly 100 will be referred to as lateral end faces. A magnetic gap, or a spacing in the carriage assembly 100 between the voice coil magnet 19 and the voice coil yoke 27, is narrowed in order to maintain a magnetic field strength. Accordingly, a portion of the carriage assembly 100 disposed at the magnetic gap has a wall thickness that is thinner than that of the area surrounding the pivot hole 103. The transverse end faces of the voice coil 33 are exposed as follows. Specifically, the entire transverse end face on the front side of the carriage assembly 100 is exposed, while the transverse end face on the backside of the carriage assembly 100 is exposed except at portions thereof covered by the connection portion 122 and the reinforcement portion 119.

FIG. 4(A) shows a cross section of the coil side 111a of the voice coil 33 and the outer holding portion 113a and the inner holding portion 115a that support the coil side 111a. The outer end face of the voice coil 33 and each of the outer holding portions of the carriage housing 101, and the inner end face of the voice coil 33 and each of the inner holding portions of the carriage housing 101, are respectively in tight contact with each other as being injection-molded and are not fixed together through a special method, such as using an adhesive or the like.

The voice coil 33 is molded by first winding the conductive wire around a mold that corresponds to the inner holding portions 115a, 115b, 115c, and 115d. The voice coil 33 is formed by stacking a plurality of aligned windings of turns of the conductive wire, one on top of another, in a longitudinal direction from the inside toward the outside. Aligned winding refers to winding of the conductive wire tightly with no spacing allowed therebetween. In accordance with the embodiment, a conductive wire having a circular cross section is used and seven turns of the conductive wire is wound to form an innermost peripheral layer 121. Six turns of the conductive wire is then wound to form a layer 123. A center of each winding of the conductive wire forming the layer 123 is disposed at each boundary between the windings of the innermost peripheral layer 121, so that a volumetric efficiency of the turns is enhanced. It should be noted that, according to the present invention, the cross sectional shape of the conductive wire is not limit to a circle.

The voice coil 33 includes alternate and repeated seven turns and six turns of the conductive wire, stacked one on top of another in the longitudinal direction, from the innermost peripheral layer 121 to an outermost peripheral layer 127. To form a complete layer, the outermost peripheral layer 127 needs to be formed by winding six turns of the conductive wire. According to the embodiment, however, the conductive wire is wound three turns only from the transverse end face on the backside, thus forming an incomplete layer. As a result, a step that is lower toward the front side from the backside is formed between the outermost peripheral layer 127 and a layer 125 that is adjacent thereto and inner therefrom. Because of the step formed, the outer holding portion 113a tends to be deviated toward the front side of the carriage housing 101 as described with reference to FIG. 7(B).

According to the embodiment, the reinforcement portion 119 is formed on the backside of the outer holding portion 113a. The reinforcement portion 119 is formed through injection molding as an integrated body with the outer holding portion 113a so as to cover part of the transverse end face on the backside of the coil side 111a. In accordance with this arrangement, the outer holding portion 113a opposes a force acting from the front side toward the backside with the step between the outermost peripheral layer 127 and the layer 125 adjacent thereto and inner therefrom. Further, the outer holding portion 113a opposes a force acting from the backside toward the front side with the reinforcement portion 119 and the transverse end face on the backside of the coil side 111a.

This eliminates the possibility of the outer holding portion 113a being damaged by handling during the assembly process. The voice coil 33 has a high stiffness relative to the carriage housing 101 and is not itself deformed. The reinforcement portion 119 is formed into a small circular shape at a location near the latch engagement portion 117a. The reinforcement portion 119 is formed near the latch engagement portion 117a for the following reason. Specifically, the carriage housing 101 is more often picked up by a mechanical device or tweezers at the latch engagement portions 117a, 117b during assembly of the magnetic disk drive. Accordingly, the outer holding portion 113a is most often damaged at the position of the reinforcement portion 119.

In addition, the reinforcement portion 119 is formed to have a small area for the following reasons. Specifically, an arrangement should be provided so that, when the carriage housing is assembled into the magnetic disk drive, the reinforcement portion does not interfere with the voice coil magnet 19, the latch mechanism, or the like, in the range of rotation of the actuator assembly. Another reason is to minimize a change in the position of a center of gravity of the carriage assembly 100 made as a result of forming of the reinforcement portion 119 from that maintained before the forming of the reinforcement portion 119. Without restrictions in space and in the position of the center of gravity, therefore, the reinforcement portion 119 may be formed into a band shape extending in a longitudinal direction of the outer holding portion 113a.

In the arrangement described above, the step formed in the layer of the coil in contact with the outer holding portion 113a ensures that the outer holding portion 113a is deviated only in a predetermined direction. It is therefore necessary to form the reinforcement portion 119 only on the backside. Accordingly, the arrangement is suitable for a need to reinforce the carriage assembly in a narrow space. If a space may be made available on the front side of the carriage assembly 100, the conductive wire for the outermost peripheral layer 127 is wound three turns in alignment with each other from the transverse end face on the front side so as to form a step that is lower toward the backside from the front side. Then, a reinforcement portion may be formed so as to cover part of the transverse end face on the front side of the coil side 111a.

When the conductive wire is wound the number of turns as determined by torque requirements of the actuator assembly 31, it is not possible to select the number of turns of the conductive wire for the outermost peripheral layer 127. Since there is generally some allowance available for the number of turns, however, it is possible to adjust the number of turns of the coil of the outermost peripheral layer 127 or a layer in contact with the outer holding portion 113a. In FIG. 4(A), the outermost peripheral layer 127 includes three conductive wires. As the number of conductive wires in the outermost peripheral layer 127 decreases to two or one, the conductive wire lacks in strength, thus becoming unable to oppose an external force applied to the outer holding portion 113a from the front side toward the backside.

Further, if there is too small a difference between the number of conductive wires in the outermost peripheral layer, such as five to six, and that in the layer adjacent thereto and inner therefrom, the thickness of an area of the outer holding portion 113a opposing the step in the outermost peripheral layer 127 relative to an external force in an identical direction becomes thin and thus easier to be damaged. It is therefore preferable that the number of conductive wires for the outermost peripheral layer be selected so as to fall within a range of about 40% to 60% (in this case, three to four) of the number of conductive wires of the layer 125 adjacent to and inner from the outermost peripheral layer 127 and the conductive wire be wound in alignment with each other from either one of the transverse end faces of the voice coil. Comparison was made of the carriage assembly 100 of an identical type in terms of shear strength between a sample having the reinforcement portion 119 formed thereon as shown in FIG. 4(A) and one having no reinforcement portion formed thereon. It was then confirmed that the shear strength of the former was improved to 222 gf, while that of the latter was rated 120 gf. The shear strength was measured as follows. Specifically, with the area near a pivot opening in the carriage assembly held in position, a force was applied to a central portion of the outer holding portion 113a from the backside toward the front side until the outer holding portion 113a is deviated from the coil side 111a or a fused state between the outer end face of the coil side 111a and the outer holding portion 113a is released.

Since there is some allowance for the number of turns of the conductive wire, it is appropriate that the outermost peripheral layer 127 be formed of a complete layer including six conductive wires, thereby offering a flat outer end face of the voice coil 33. Having a flat outer end face, the outer holding portion 113a may be easily damaged in either direction laterally as shown in FIG. 7(C). In such a case, reinforcement portions 119, 120 are formed to cover part of the transverse end faces on both sides of the coil side 111a as shown in FIG. 4(B).

Reinforcement of the outer holding portion has heretofore been described. Alternatively, the inner holding portion 115a may be reinforced by using the reinforcement portion. It is safe to consider that the inner end face of the voice coil 33 in contact with the inner holding portion 115a is flat, since the innermost peripheral layer generally includes the complete number of conductive wires or the number of conductive wires close to the complete number. To reinforce the inner holding portion 115a having the foregoing characteristics, the reinforcement portions may be formed to cover part of the transverse end faces on both sides as shown in FIG. 4(B).

Figure 5:
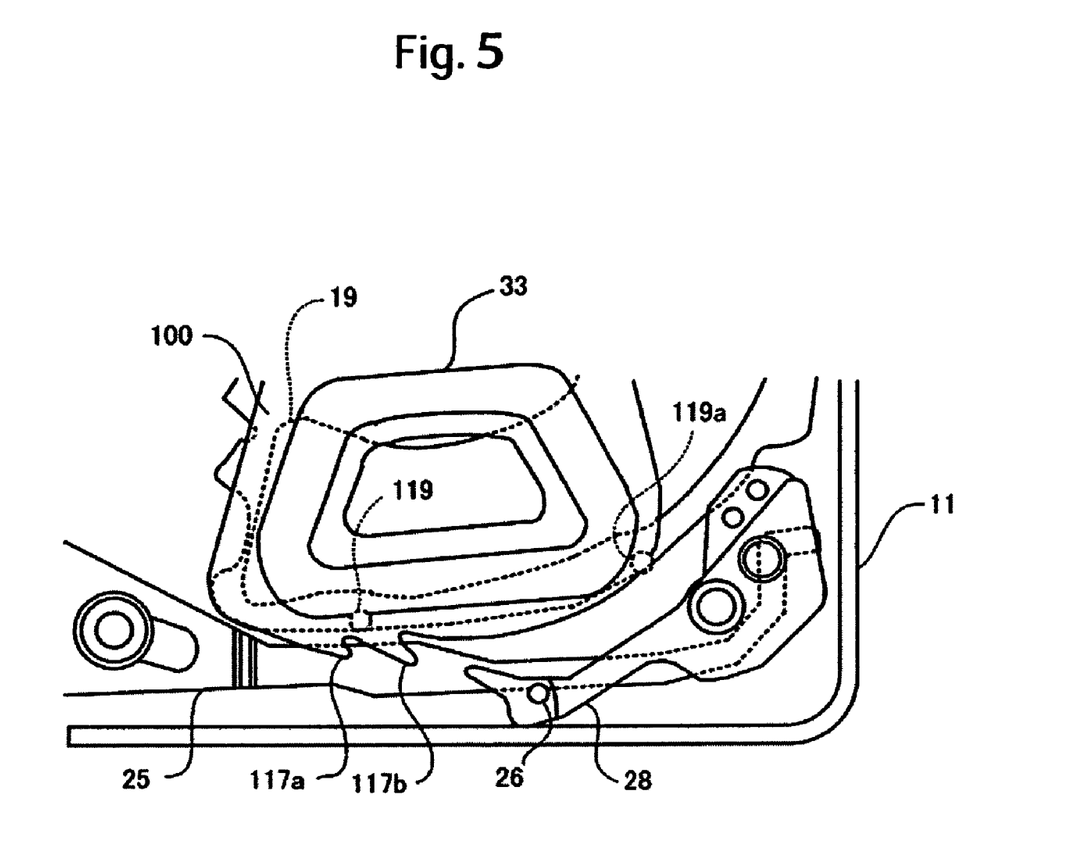
FIG. 5 is a plan view showing a portion of the carriage assembly mounted on a base.

FIG. 5 is a plan view showing a part of what is shown in FIG. 2(A), from which the voice coil yoke 27 is removed. FIG. 5 is a view showing the carriage assembly 100 disposed on the voice coil magnet 19 mounted on the base 11. The reinforcement portion 119 is formed on the backside of the carriage assembly 100. Further, FIG. 5 shows a condition, in which the actuator assembly 31 is in a retracted position in the ramp mechanism 39. A reinforcement portion 119a is disposed at a position, at which the actuator assembly 31 is positioned on the innermost peripheral side of the magnetic disk 13. The shape of the carriage assembly is omitted at the position of the reinforcement portion 119a.

The latch mechanism including the long lever 25 and the short lever 28 is disposed in a space formed between the carriage assembly 100 and a side wall of the base 11. The latch mechanism functions as follows. Specifically, if an external impact is applied to the magnetic disk drive 10 while the actuator assembly 31 is in the retracted position in the ramp mechanism 39, an engagement pin 26 formed on the short lever 28 is engaged with the latch engagement portion 117a or the latch engagement portion 117b. The magnetic head is thereby prevented from moving to a surface of the magnetic disk 13.

The magnetic gap between the backside of the carriage assembly 100 and the front side of the voice coil magnet 19, and between the front side of the carriage assembly 100 and the front side of the voice coil yoke 27, is kept to a value as small as possible in order to reduce magnetic resistance. As shown in FIG. 2(A), the voice coil yoke 27 has an area wide enough to cover a substantial part of the voice coil of the carriage assembly 100. Accordingly, it is difficult to form the reinforcement portion in such a condition that the reinforcement portion protrudes from the front side of the carriage assembly 100. In this respect, in accordance with the embodiment, the direction in which the outer holding portion 113a is easy to be damaged is controlled to be toward the front side from the backside by the winding of the outermost peripheral layer 127. This eliminates the need for forming the reinforcement portion on the backside.

It is difficult, also on the backside of the carriage assembly 100, to form the reinforcement portion 119 at a position of the voice coil magnet 19, onto which the reinforcement portion 119 is projected. According to the embodiment, the reinforcement portion 119 is formed at a position, at which a projected trajectory of the reinforcement portion 119 defined in a range, through which the carriage assembly 100 rotates, does not overlap the voice coil magnet 19. The reinforcement portion 119 is disposed at a position, at which interference with the latch mechanism may be avoided.

FIGS. 6(A) through 6(D) are views for exemplary illustrating other embodiments, in which the outer holding portion is prevented from being damaged. FIGS. 6(A) through 6(D) are cross-sectional views of the position corresponding to that of FIGS. 4(A) and 4(B). A voice coil 150, 160, 170, or 180 of a plurality of layers of aligned windings is clamped between an outer holding portion 113a and an inner holding portion 115a. According to any of methods depicted in FIGS. 6(A) through 6(D), the outer holding portion 113a may be prevented from being damaged without providing a reinforcement portion by devising the method of winding the outermost peripheral layer or a layer close thereto of the voice coil.

Figure 6:
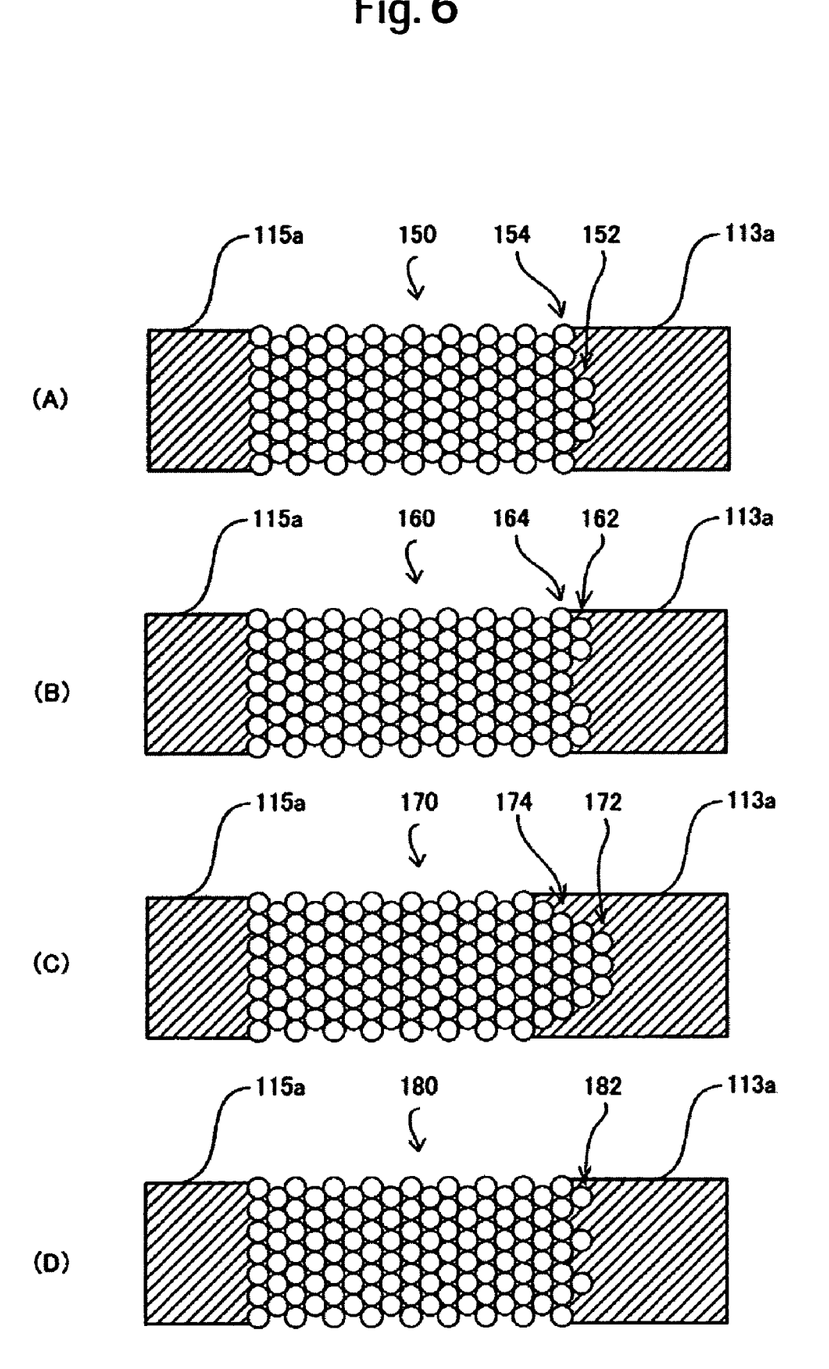
FIGS. 6(A) through 6(D) are cross-sectional views showing other embodiments of the carriage assembly.

In the arrangement shown in FIG. 6(A), a conductive wire of an outermost peripheral layer 152 is wound three turns at a central portion in a lateral direction. As a result, steps are formed on both sides of the transverse end face relative to a layer 154 adjacent to and inner from the outermost peripheral layer 152. Each of these steps opposes an external force applied from the front side to the backside of the outer holding portion 113a and an external force applied in an opposite direction thereto, respectively. In the arrangement shown in FIG. 6(B), a conductive wire of an outermost peripheral layer 162 is wound two turns each on either side of the transverse end face in a lateral direction. As a result, a step is formed at a central portion relative to a layer 164 adjacent to and inner from the outermost peripheral layer 162. This step again opposes forces of two directions of damaging an outer holding portion 113a.

In the arrangement shown in FIG. 6(C), the voice coil 170 is stacked in a pyramid form by gradually reducing the number of turns from an outermost peripheral layer 172 toward layers 174 inner therefrom. In the arrangement shown in FIG. 6(D), a conductive wire of an outermost peripheral layer 182 of the voice coil 180 is wound with a spacing interposed between two adjoining turns, instead of using the aligned winding. The synthetic resin sneaks into the spacing between the conductive wire turns. The synthetic resin thus opposes forces of two directions of damaging an outer holding portion 113a.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A support structure for a coil in a carriage assembly of a rotating disk data storage device comprising:
   a coil including a stack of layers of aligned windings of a conductive wire;
   a carriage housing having a pivot hole, an inner holding portion holding an inner end face of the coil, and an outer holding portion holding an outer end face of the coil, the carriage housing being injection-molded integrally with the coil; and
   a reinforcement portion formed at a position opposing the pivot hole across the coil of the outer holding portion for covering a portion of the exposed transverse end faces of the coil,
   wherein the reinforcement portion is disconnected from the inner holding portion,
   wherein the reinforcement portion is formed to cover a bottom side of an outermost peripheral layer of the coil,
   wherein the reinforcement portion is formed (a) to not cover the top side of a particular layer adjacent to the outermost peripheral layer of the coil and (b) to cover the top side of the outermost peripheral layer of the coil,—
   wherein the outermost peripheral layer of the coil comprises half or less windings than any other layer of the coil, and
   wherein the windings in the outermost peripheral layer are (a) all adjacent to one another and (b) collectively disposed closer to the bottom side of the coil than to either the top side of the coil or the midpoint between the bottom side of the coil and the top side of the coil.

2. The support structure according to claim 1, wherein the reinforcement portion is formed to cover part of each of the transverse end faces on the front side and on the backside of the coil.

3. The support structure according to claim 1, wherein the number of turns of the coil is selected so as to form a step between layers of the coil in contact with the outer holding portion.

4. The support structure according to claim 3, wherein the step is formed between the outermost peripheral layer and a layer immediately inner from the outermost peripheral layer of the coil.

5. The support structure according to claim 3, wherein the step is formed by the outermost peripheral layer that represents aligned windings of a conductive wire wound the number of turns selected so as to fall within a range of about 40% to 50% of the number of turns of the conductive wire of a layer adjacent to and immediately inner from the outermost peripheral layer of the coil, the aligned windings starting with a first transverse end face of the coil.

6. The support structure according to claim 3, wherein the reinforcement portion is formed so as to not cover part of the transverse end face of the coil disposed on a higher end of the step.

7. The support structure according to claim 1, further comprising:
   a second reinforcement portion formed at the inner holding portion for covering part of the transverse end face of the coil.

8. The support structure according to claim 1, wherein the reinforcement portion is formed through injection molding integrally with the carriage housing.

9. The support structure according to claim 1, wherein the outer holding portion is comprised by four continuous outer peripheral holding portions arranged to support the outer end face of the coil, and the reinforcement portion is formed on the outer peripheral holding portion disposed farthest from the pivot hole.

10. A magnetic disk drive comprising:
    a base;
    a magnetic disk rotatably mounted on the base;
    a voice coil magnet;
    a coil comprised of a stack of layers of aligned windings of a conductive wire;

a carriage assembly having a carriage housing rotatably mounted on the base and formed through injection molding integrally with the coil so as to hold an outer end face of the coil; and a reinforcement portion formed at an outer holding portion for holding the coil for covering a part of the transverse ends of both front side and a backside face of the coil, wherein the reinforcement portion is formed to cover a bottom side of an outermost peripheral layer of the coil, wherein the reinforcement portion is formed to (a) not cover a top side of a particular layer adjacent to the outermost peripheral layer of the coil and (b) to cover the top side of the outermost peripheral layer of the coil,— wherein the outermost peripheral layer of the coil comprises half or less windings than any other layer of the coil, and wherein the windings in the outermost peripheral layer are (a) all adjacent to one another and (b) collectively disposed closer to the bottom side of the coil than to either the top side of the coil or the midpoint between the bottom side of the coil and the top side of the coil.

11. The magnetic disk drive according to claim 10, wherein a layer of the coil in contact with the outer holding portion having a step formed therein and the reinforcement portion is formed so as to cover part of the transverse end face of the coil disposed on a higher end of the step.

12. The magnetic disk drive according to claim 10, wherein the voice coil magnet is held to the base and the reinforcement portion is formed so as to cover part of the transverse end face of the coil opposing the base, the reinforcement portion thereby being disposed outside from an outline of the voice coil magnet in a range of rotation of the carriage assembly.

13. The magnetic disk drive according to claim 10, wherein the carriage housing has a plurality of continuous outer holding portions surrounding the outer end face of the coil and the reinforcement portion is formed into a band shape extending in a longitudinal direction of an outer holding portion disposed farthest from the pivot hole.

14. The magnetic disk drive according to claim 10, wherein a diameter of the magnetic disk is 25 mm or less.

15. The magnetic disk drive according to claim 10, further comprising:

a latch engagement portion so that the carriage housing latches the carriage assembly, wherein the reinforcement portion is formed near the latch engagement portion.

* * * * *